(12) United States Patent
Maruyama et al.

(10) Patent No.: US 11,512,195 B2
(45) Date of Patent: Nov. 29, 2022

(54) METHOD FOR PRODUCING FILLER-RESIN COMPOSITE

(71) Applicant: HITACHI ZOSEN CORPORATION, Osaka (JP)

(72) Inventors: Hiroyuki Maruyama, Osaka (JP); Tetsuya Inoue, Osaka (JP); Manabu Tazaki, Tokyo (JP)

(73) Assignee: Hitachi Zosen Corporation, Osaka (JP)

( * ) Notice: Subject to any disclaimer, the term of this patent is extended or adjusted under 35 U.S.C. 154(b) by 419 days.

(21) Appl. No.: 16/637,308

(22) PCT Filed: Aug. 7, 2018

(86) PCT No.: PCT/JP2018/029574
§ 371 (c)(1),
(2) Date: Feb. 7, 2020

(87) PCT Pub. No.: WO2019/031493
PCT Pub. Date: Feb. 14, 2019

(65) Prior Publication Data
US 2020/0255645 A1 Aug. 13, 2020

(30) Foreign Application Priority Data
Aug. 10, 2017 (JP) .............................. JP2017-155090

(51) Int. Cl.
C08J 5/18 (2006.01)
C08L 27/12 (2006.01)
C08K 3/04 (2006.01)

(52) U.S. Cl.
CPC .............. *C08L 27/12* (2013.01); *C08K 3/041* (2017.05)

(58) Field of Classification Search
CPC .............. C08L 27/12; C08K 3/041; C08J 5/18
See application file for complete search history.

(56) References Cited

U.S. PATENT DOCUMENTS

| 2011/0133135 A1 | 6/2011 | Maeno et al. |
| 2012/0315459 A1 | 12/2012 | Fugetsu et al. |

(Continued)

FOREIGN PATENT DOCUMENTS

| CN | 102159499 A | 8/2011 |
| CN | 103390753 A | 11/2013 |

(Continued)

OTHER PUBLICATIONS

Dictionary of Chemical Substances, Vulcanized Rubber, Mar. 22, 2022 with English translation (4 pgs.).

(Continued)

*Primary Examiner* — Sarah K Salerno
(74) *Attorney, Agent, or Firm* — Pillsbury Winthrop Shaw Pittman, LLP

(57) ABSTRACT

The present invention includes a method for producing a filler-resin composite including (a) preparing a filler assembly in which a plurality of fillers are assembled, (b) impregnating at least one end in the thickness direction of the filler assembly with a first polymer soluble in liquid to produce a first polymer layer, (c) impregnating a portion of the filler assembly other than the one end in the thickness direction with a second polymer insoluble to the liquid to produce a second polymer layer, and (d) dissolving the first polymer layer impregnated at at least an end in the thickness direction of the filler assembly in the liquid to remove the first polymer layer.

1 Claim, 4 Drawing Sheets

(56) References Cited

U.S. PATENT DOCUMENTS

| | | |
|---|---|---|
| 2013/0295432 A1 | 11/2013 | Inoue |
| 2017/0029275 A1 | 2/2017 | Starkovich et al. |
| 2019/0002284 A1 | 1/2019 | Inoue et al. |

FOREIGN PATENT DOCUMENTS

| | | |
|---|---|---|
| JP | 2004-025570 A | 1/2004 |
| JP | 2010-240871 A | 10/2010 |
| JP | 2015-098418 A | 5/2015 |
| JP | 2015-138718 A | 7/2015 |
| WO | 2007/116706 A1 | 10/2007 |
| WO | 2011/099617 A1 | 8/2011 |
| WO | 2017/115832 A1 | 7/2017 |

OTHER PUBLICATIONS

International Search Report dated Oct. 23, 2018 issued in corresponding International Patent Application No. PCT/JP2018/029574 with English translation.

METHOD FOR PRODUCING FILLER-RESIN COMPOSITE

CROSS-REFERENCE TO RELATED APPLICATIONS

This Application is the U.S. National Stage of PCT/JP2018/029574, filed Aug. 7, 2018, which claims priority to Japanese Patent Application No. 2017-155090, filed Aug. 10, 2017, the contents of each of which are incorporated herein by reference in entirety.

TECHNICAL FIELD

The present invention relates to a method for producing a filler-resin composite.

BACKGROUND ART

Conventionally, as a composite of filler and resin, an immersed product in which vertically-aligned carbon nanotube group and a thermoplastic resin film are integrated has been known (ref: Patent Document 1 below).

The immersed product includes the vertically-aligned carbon nanotube group transferred from a growth substrate to the thermoplastic resin film, and is produced by embedding or penetrating the distal end portion (end portion not in contact with growth substrate) of the carbon nanotube group on the growth substrate to the thermoplastic resin film, and then removing the growth substrate, impregnating the carbon nanotube group with an impregnant, and removing only the thermoplastic resin film.

CITATION LIST

Patent Document

Patent Document 1: Japanese Unexamined Patent Publication No. 2010-240871

SUMMARY OF THE INVENTION

Problem to be Solved by the Invention

However, with the method for producing a composite of filler and resin described in the above-described Patent Document 1, the distal end portion of the carbon nanotube group is embedded or penetrated in the thermoplastic resin film, and therefore when only the thermoplastic resin film is released off from the composite material of the integrated carbon nanotube group, thermoplastic resin film, and impregnant, the thermoplastic resin film, and the carbon nanotube group embedded or penetrated in the thermoplastic film may damage the immersed product. Therefore, it is difficult to control the exposure of the distal end of the carbon nanotube of the composite. Also, the carbon nanotube group in the composite is embedded or penetrated in the thermoplastic resin film, and therefore there are disadvantages in that when the thermoplastic resin film is released off, the distal end of the carbon nanotube group remained in the thermoplastic resin film is ripped off, thereby shortening the length of the carbon nanotube group.

An object of the present invention is to provide a method for producing a filler-resin composite with which exposure of the distal end of one end portion of the filler layer can be controlled easily.

Means for Solving the Problem

The present invention [1] includes a method for producing a filler-resin composite, the method including: (a) preparing a filler assembly in which a plurality of fillers are assembled, (b) impregnating at least one end in the thickness direction of the filler assembly with a first polymer soluble in liquid to produce a first polymer layer, (c) impregnating a portion of the filler assembly other than the one end in the thickness direction with a second polymer insoluble to the liquid to produce a second polymer layer, and (d) dissolving the first polymer layer impregnated at at least an end in the thickness direction of the filler assembly in the liquid to remove the first polymer layer.

The present invention [2] includes a method for producing a filler-resin composite, the method including: preparing a filler assembly in which a plurality of fillers are assembled, applying a first polymer layer soluble in liquid on a substrate, laminating a second polymer layer insoluble to the liquid on the first polymer layer applied on the substrate, inserting the filler assembly to the first polymer layer penetrating through the second polymer layer, and dissolving the first polymer layer in the liquid to remove the first polymer layer.

The present invention [3] includes the method for producing a filler-resin composite of the above-described [1], wherein in the step (b), each of end portions in the thickness direction of the filler assembly is impregnated separately in the first polymer to produce a first polymer layer, and in the step (c), a gap between the impregnated first polymer layers at each end is impregnated with the second polymer to produce a second polymer layer.

The present invention [4] includes the method for producing a filler-resin composite of any one of the above-described [1] to [3], wherein the liquid is an organic solvent.

The present invention [5] includes the method for producing a filler-resin composite of any one of the above-described [1] to [4], wherein the first polymer is resin containing no vulcanization agent, and the second polymer is resin containing a vulcanization agent.

The present invention [6] includes the method for producing a filler-resin composite of the above-described [5], wherein the resin is fluorine rubber.

The present invention [7] includes the method for producing a filler-resin composite of any one of the above-described [1] to [6], wherein the filler assembly is vertically-aligned carbon nanotube.

Effects of the Invention

The method for producing a filler-resin composite of the present invention allows the distal end of the filler assembly to easily expose from the polymer layer.

DESCRIPTION OF THE EMBODIMENTS

The inventors of the present invention found out the following and completed the present invention: upon producing a filler-resin composite, by impregnating at least an end in the thickness direction of the filler assembly in which a plurality of fillers assembled with the first polymer soluble in liquid, and impregnating the portion other than the end of the filler assembly with a second polymer insoluble to the liquid to dissolve and remove the first polymer, the distal end of the end of the filler assembly can be easily exposed from the second polymer.

The first embodiment and the second embodiment of the present invention are described below in detail, but the present invention is not limited to the embodiments below, and can be suitably modified.

First Embodiment

FIG. 1A to FIG. 2B illustrate the method for producing a filler-resin composite of the first embodiment of the present invention.

Figure 1A:
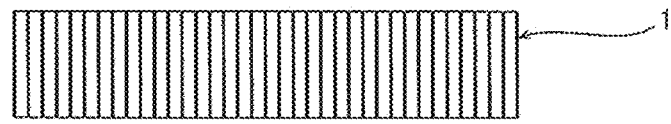
FIG. 1A to FIG. 1D illustrate the method for producing a filler-resin composite of the first embodiment, FIG. 1A showing a preparation step, FIG. 1B showing an application step, FIG. 1C showing a lamination step, and FIG. 1D showing a pressing step.
Figure 1B:
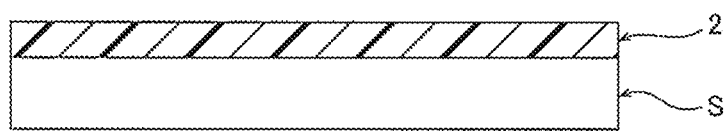
Figure 1C:
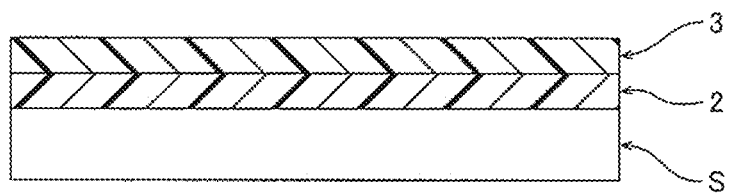
Figure 1D:
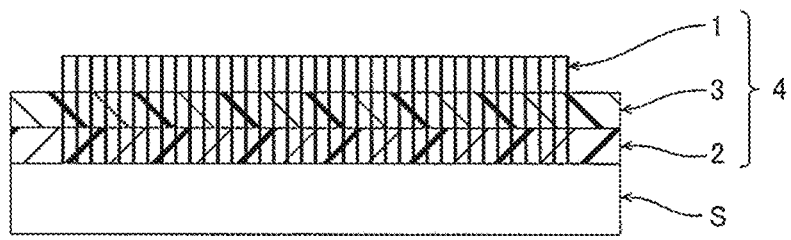
Figure 2A:
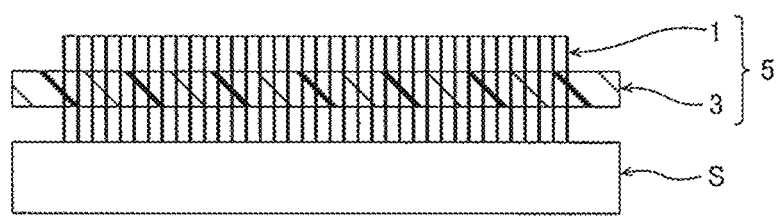
FIG. 2A and FIG. 2B illustrate, following FIG. 1D, the method for producing a filler-resin composite of the first embodiment, FIG. 2A illustrating a removal step, and FIG. 2B illustrating a state where the filler-resin composite is removed from the substrate.
Figure 2B:
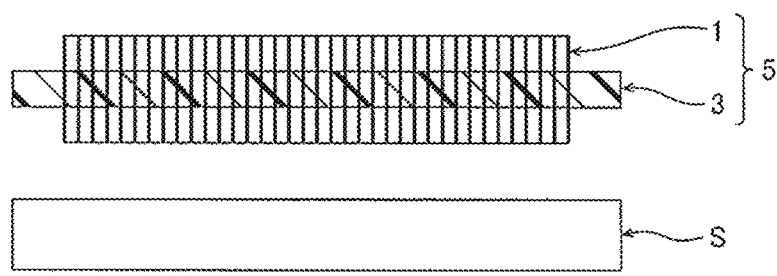

The method for producing a filler-resin composite of the first embodiment of the present invention includes preparing a filler assembly 1 in which a plurality of fillers assembled (ref: FIG. 1A), applying a liquid soluble first polymer layer 2 on a substrate S (ref: FIG. 1B), laminating a liquid insoluble second polymer layer 3 on the first polymer layer 2 applied on the substrate S (ref: FIG. 1C), inserting the filler assembly 1 to the first polymer layer 2 penetrating the second polymer layer 3 (ref: FIG. 1D), and dissolving the first polymer layer 2 in the liquid to be removed (ref: FIG. 2A and FIG. 2B).

As shown in FIG. 1A, in the preparation step, a filler assembly 1 in which a plurality of fillers assembled is prepared.

Examples of the filler include a carbon material, ceramic material, and metal material.

Examples of the carbon material include carbon black, carbon nanotube, and carbon nanocoil.

Examples of the ceramic material include carbide, nitride, and oxide. Examples of the carbide include silicon carbide, boron carbide, chromium carbide, and titanium carbide; examples of nitride include silicon nitride, and boron nitride; and examples of oxide include aluminum oxide (alumina) and titanium oxide.

Examples of the metal material include copper, gold, nickel, tin, iron, or alloys thereof.

The shape of the filler can be, without particular limitation, for example, particulate, acicular, and fibrous.

The filler assembly 1 is preferably formed as a layer in which a plurality of fillers are closely assembled. The layer means that the filler is piled on top of each other in up-down direction one by one.

The filler assembly 1 may include a plurality of separate filler assemblies.

The filler assembly 1 can give desired characteristics based on the filler characteristics to the filler-resin composite to be described later. Examples of the filler characteristics include rigidity, electrical conductivity, thermal conductivity, and electromagnetic wave absorption.

The filler may have a plurality of types of characteristics. For example, when a plurality of fillers having thermal conductivity are arranged in the thickness direction of the filler assembly 1, the filler assembly 1 can conduct heat in the thickness direction from one end surface to the other end surface.

Examples of the filler assembly 1 include vertically-aligned carbon nanotube (in the following, referred to as aligned CNT). The carbon nanotube composing the aligned CNT can be any of single-wall carbon nanotubes or multi-wall carbon nanotubes. The aligned CNT is preferably covered with amorphous carbon.

The thickness of the aligned CNT is not particularly limited, and for example, preferably 10 μm to 300 μm.

When the aligned CNT has a thickness of 10 μm or more, the filler-resin composite has excellent handleability. When the aligned CNT has a thickness of 300 μm or less, excessive increase in production costs of carbon nanotube can be suppressed.

Next, description is given below of the application step. As shown in FIG. 1B, the application step is a step in which the first polymer soluble in liquid is applied to the substrate S to form the first polymer layer 2.

The first polymer is a polymer that is soluble to liquid. The liquid is a liquid to which the first polymer is soluble and the second polymer to be described later is insoluble. The liquid is generally categorized into organic solvents and water: and examples of the organic solvent include aprotic polar organic solvent, protic polar organic solvent, and nonpolar organic solvent. Examples of the aprotic polar organic solvent include ketone solvents such as acetone, methyl ethyl ketone, and isophorone; pyrrolidone solvents such as 2-pyrrolidone, and N-methylpyrrolidone (NMP); ester solvents such as ethyl acetate; ether solvents such as diethyl ether and tetrahydrofuran; amide solvents such as dimethylformamide; and sulfoxide solvents such as dimethyl sulfoxide. Examples of the protic polar organic solvent include alcohol solvents such as isopropyl alcohol. Examples of the nonpolar organic solvent include aliphatic hydrocarbon such as hexane and cyclohexane, and aromatic hydrocarbons such as benzene and toluene. The liquid is preferably organic solvent. The liquid is, when the first polymer is fluorine rubber (described later) containing no vulcanization agent and the second polymer is fluorine rubber (described later) containing a vulcanization agent, the ketone organic solvent, or pyrrolidone solvent are preferable.

For the first polymer soluble to the organic solvent, for example, thermosetting resin (for example, fluorine resin, silicone resin, urethane resin, etc.) containing no vulcanization agent (cross-linking agent) is used. The fluorine resin includes fluorine rubber such as Viton (registered trademark) series (manufactured by Chemours).

The first polymer can be thermoplastic resin (for example, acrylic resin, polyolefin resin, etc.).

Examples of the first polymer soluble to water is, for example, polyvinyl alcohol (PVA), polyvinyl pyrrolidone (PVP), polyacrylic acid (or its salt), poly methacrylic acid (or its salt), poly acrylamide, cellulose derivative (for example, hydroxy methyl cellulose, carboxymethyl cellulose, etc.), polysaccharides (for example, xanthan gum, etc.).

The first polymer is preferably a first polymer soluble to organic solvents, and more preferably, fluorine rubber containing no vulcanization agent.

To apply the first polymer to the substrate S, for example, the first polymer is dissolved in the above-described liquid to prepare the first polymer solution, and the produced first polymer solution is applied to the substrate S.

The application of the first polymer is preferably conducted by the doctor blade method, for a homogenous thickness. When the first polymer solution is used, the first polymer solution is applied, and then dried to form the first polymer layer 2.

The first polymer layer 2 preferably has a thickness of, for example, ½ or less of the thickness of the filler assembly 1, more preferably ⅓ or less. For example, when the filler assembly 1 is the aligned CNT, the thickness is for example, 3 µm to 100 µm.

Next, description is given below of the lamination step. As shown in FIG. 1C, the lamination step is a step in which the second polymer layer 3 is laminated on the first polymer layer 2 applied on the substrate S: the second polymer layer 3 is insoluble to the liquid to which the first polymer layer 2 is soluble.

The second polymer is insoluble to the liquid to which the first polymer is soluble. For the liquid, a liquid to which the first polymer is soluble and the second polymer is insoluble is selected from the above-described liquid.

For the second polymer insoluble to the organic solvent, for example, the above-described thermosetting resin containing a vulcanization agent (cross-linking agent) is used. When the second polymer insoluble to the organic solvent is thermosetting resin, the second polymer layer 3 produced in the lamination step is in a B-stage state, and in the pressing step to be described later, vulcanized (crosslinked) to go through thermosetting to be insoluble to organic solvents. The second polymer can be thermoplastic resin that is different from the first polymer.

For the second polymer insoluble to water, for example, the above-described thermosetting resin and thermoplastic resin are used.

The second polymer is preferably thermosetting resin containing a vulcanization agent, and more preferably fluorine rubber containing a vulcanization agent.

To laminate the second polymer layer 3 to the first polymer layer 2, for example, the second polymer is dissolved in a solvent capable of dissolving the second polymer to prepare a second polymer solution, and the produced second polymer solution is applied to the first polymer layer 2.

The second polymer is preferably applied on the first polymer layer 2 to give a homogenous thickness by the doctor blade method. When the second polymer solution is used, after applying the second polymer solution, it is dried to form the second polymer layer 3.

The second polymer layer 3 has a thickness of, for example, ½ or less, preferably ⅓ or less the thickness of the filler assembly 1. For example, when the filler assembly 1 is aligned CNT, for example, the thickness is preferably 3 µm to 100 µm.

The thickness of the first polymer layer 2 and second polymer layer 3 in total is preferably ⅔ or less the thickness of the filler assembly 1. The thickness of the first polymer layer 2 and second polymer layer 3 in total is, for example, when the filler assembly 1 is aligned CNT, for example, 6 µm to 200 µm.

Next, description is given below of the pressing step. As shown in FIG. 1D, the pressing step is a step in which the filler assembly 1 is inserted into the first polymer layer 2 penetrating through the second polymer layer 3 laminated on the substrate S. By inserting the filler assembly 1 into the first polymer layer 2 penetrating through the second polymer layer 3 laminated on the substrate S, a filler-two layer polymer composite 4 is obtained. The filler assembly 1 is preferably reaching the surface of the substrate S penetrating further through the second polymer layer 3.

In the pressing step, the filler assembly 1 is preferably inserted into the first polymer layer 2 under a high temperature atmosphere penetrating through the second polymer layer 3 laminated on the substrate S. The high temperature means that, when the first polymer layer 2 and second polymer layer 3 are thermoplastic resin, a temperature that softens the first polymer layer 2 and second polymer layer 3. Meanwhile, when the first polymer layer 2 and second polymer layer 3 are thermosetting resin, the high temperature means that a temperature that allows the B-stage second polymer layer 3 to softens and thereafter cure. The pressing step can be a heat pressing in which the filler assembly 1 is inserted into the first polymer layer 2 and second polymer layer 3 using a high temperature heater.

In the filler-two layer polymer composite 4, at least one end portion in the thickness direction of the filler assembly 1 is impregnated with the first polymer, and a portion other than the at least one end portion in the thickness direction of the filler assembly 1 is impregnated with the second polymer insoluble to the liquid. The both ends of the filler assembly 1 in the thickness direction can be impregnated with the first polymer.

Next, description is given below of the removal step. The removal step is a step in which the first polymer layer 2 is dissolved in the liquid to be removed.

A liquid capable of dissolving the first polymer but incapable of dissolving the second polymer is selected from the above-described liquid.

To remove the first polymer layer 2 by dissolving it in the liquid, for example, the filler-two layer polymer composite 4 and substrate S are immersed in a vessel in which a predetermined liquid is stored, and the first polymer layer 2 is dissolved in the liquid. That is, when the filler-two layer polymer composite 4 is allowed to contact the same type of the liquid, the first polymer layer 2 is dissolved in the liquid and removed, and the second polymer layer 3 is not dissolved in the liquid and remained as a layer.

By the first polymer layer 2 being dissolved in the liquid, as shown in FIG. 2A, one end of the filler assembly 1 that has been covered with the first polymer layer 2 is exposed. The second polymer layer 3 is remained without being dissolved in the liquid. In this manner, the filler-two layer polymer composite 4 becomes the filler-resin composite 5, in which an end of the filler assembly 1 is exposed from the second polymer layer 3.

Then, by removing the first polymer layer 2, as shown in FIG. 2B, the filler-resin composite 5 is released from the substrate S.

In the filler-resin composite 5, the liquid insoluble second polymer layer 3 fixes the filler assembly 1 to reinforce the filler assembly 1.

A plurality of different polymers may form the first polymer layer as one layer or a plurality of layers, and may form the second polymer layer as one layer or a plurality of layers.

With the method for producing a filler-resin composite of the first embodiment, the one end of the filler assembly 1 can be exposed by not dissolving the second polymer layer 3 but dissolving only the first polymer layer 2 covering one end of the filler assembly 1.

Therefore, compared with the case where the resin film covering one end of the filler assembly 1 is peeled off, disadvantages such as tearing apart of the one end of the filler assembly 1 will not be caused, and exposure of one end of the filler assembly 1 can be easily controlled.

In the first embodiment, in the pressing step, the filler assembly 1 reaches the surface of the substrate S penetrating through the second polymer layer 3. Therefore, the exposure of the one end of the filler assembly 1 is controlled so as to have the same thickness as that of the second polymer layer 3.

Second Embodiment

FIG. 3A to FIG. 3D illustrate the method for producing a filler-resin composite of the second embodiment of the present invention.

Figure 3A:
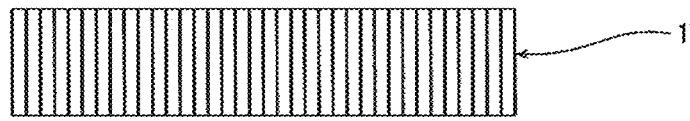
FIG. 3A to FIG. 3D illustrate the method for producing a filler-resin composite of the second embodiment, FIG. 3A showing a preparation step, FIG. 3B showing a cover formation step, FIG. 3C showing an injection step, and FIG. 3D showing a removal step.
Figure 3B:
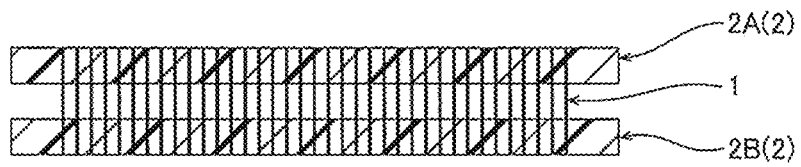
Figure 3C:
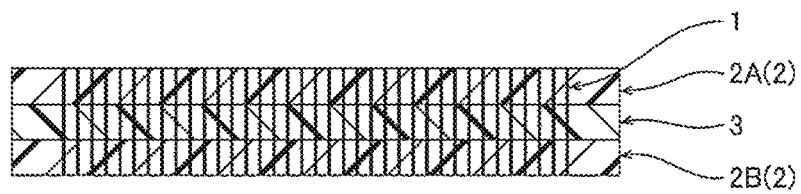
Figure 3D:

The method for producing a filler-resin composite of the second embodiment of the present invention includes preparing a filler assembly 1 in which a plurality of fillers assembled (ref: FIG. 3A), impregnating each of the end of the filler assembly 1 in the thickness direction separately with the first polymer soluble in liquid to produce a first polymer layer 2 (ref: FIG. 3B), impregnating the gap (an example of portion excluding at least one end portion of the filler assembly 1 in the thickness direction) between the impregnated first polymer layers 2 at ends with a second polymer insoluble to the liquid to produce a second polymer layer 3 (ref: FIG. 3C), dissolving the first polymer layer 2 impregnated at at least one end in the thickness direction of the filler assembly 1 in the liquid to remove the first polymer layer 2 (ref: FIG. 3D).

In the description of the second embodiment, for those members that are the same as the above-described first embodiment, the same reference numerals are given and the description thereof is omitted.

First, as shown in FIG. 3A, in the same manner as in the first embodiment, a filler assembly 1 is prepared.

Next, description is given below of the cover forming step. As shown in FIG. 3B, in the cover forming step, each of the ends of the filler assembly 1 in the thickness direction is separately impregnated with the first polymer soluble in liquid to prepare the first polymer layer 2.

For the first polymer, the resin same as the first polymer used in the above-described first embodiment is used.

To be specific, in the cover forming step, the first polymer layer 2A impregnated at one end portion in the thickness direction of the filler assembly 1 and the first polymer layer 2B impregnated at the other end of the filler assembly 1 in the thickness direction are formed. The first polymer layer 2A is spaced apart from the first polymer layer 2B in the thickness direction of the filler assembly 1.

The first polymer layer 2A is produced, for example, by applying the first polymer solution with spray to one end portion of the filler assembly 1 in the thickness direction, and then drying. The first polymer layer 2B is produced, for example, by applying the first polymer solution with spray to the other end portion of the filler assembly 1 in the thickness direction, and then drying.

Next, description is given below of the injection step. As shown in FIG. 3C, in the injection step, the gap between the impregnated first polymer layers 2A and 2B at each end is impregnated with the second polymer insoluble to the liquid to produce the second polymer layer 3.

For the second polymer, the resin same as the second polymer used in the above-described first embodiment is used.

To be specific, in the injection step, the second polymer is injected into the gap between the first polymer layer 2A and the first polymer layer 2B. The second polymer layer 3 is produced, for example, by injecting the second polymer solution into the gap between the first polymer layer 2A and the first polymer layer 2B.

When the first polymer is a thermosetting resin containing no vulcanization agent, and the second polymer is a thermosetting resin containing a vulcanization agent, after producing the second polymer layer 3, it is heated at a temperature that cures the second polymer layer 3.

Thereafter, as shown in FIG. 3D, in the same manner as in the first embodiment, the first polymer layer 2 is dissolved in a liquid to be removed.

In the second embodiment as well, the filler-resin composite 5 that is the same as in the first embodiment can be produced, and the same operations and effects as in the first embodiment can be achieved.

In the second embodiment, the first polymer layer 2 can be formed at at least one end portion in the thickness direction of the filler assembly 1. That is, in the cover forming step, the first polymer layer 2A is formed, and the first polymer layer 2B does not have to be formed. Then, in the injection step, the second polymer layer 3 can be formed at portion adjacent to the first polymer layer 2A (portion excluding one end portion of the filler assembly 1 in the thickness direction). In this case as well, the same filler-resin composite 5 as in the first embodiment can be produced, and the same operations and effects as in the first embodiment can be achieved.

(Filler-Resin Composite)

Next, a filler-resin composite 5 produced by the above-described method for producing a filler-resin composite is described. In the description of the filler-resin composite 5, for the same members as those in the above-described first embodiment and second embodiment, the same reference numerals are given and the description thereof is omitted.

As shown in FIG. 2B and FIG. 3D, the filler-resin composite 5 has a polymer layer made from a polymer insoluble to a liquid (the above-described second polymer layer 3), and a filler assembly 1 extending in the thickness direction of the polymer layer and fixed to the polymer layer in the thickness direction, and at least one end in the thickness direction of the filler assembly 1 is protruded from the polymer layer.

The liquid is preferably an organic solvent.

The filler of the filler assembly is preferably protruded by 10 to 50 μm from the polymer layer. The reasons are that it fills subtle protrusions and depressions at the interface to reduce the interface thermal resistance. When it is too protruded, the adjacent CNTs that are bent with a pressure applied in the aligned direction coagulate by van der Waals force.

The filler of the filler assembly is preferably protruded from the polymer layer by 10 to 50% of the length in the thickness direction. The reasons are that it fills the subtle protrusions and depressions at the interface to reduce the interface thermal resistance.

The present invention is not limited to the above described embodiments, various modifications are possible within the scope of the claims, and the technical scope of the present invention also includes embodiments of suitable combinations of technical means disclosed in different embodiments.

EXAMPLES

The present invention is further described in detail based on EXAMPLES and COMPARATIVE EXAMPLES below.

But the present invention is not limited to these Examples. In the following description, parts and % are by mass unless otherwise specified. The specific numerical values of mixing ratio (content), physical property value, and parameter used in the description below can be replaced with the upper limit values (numerical values defined with "or less" or "below") or lower limit values (numerical values defined with "or more" or "more than") of the corresponding numerical values of mixing ratio (content), physical property value, and parameter described in "DESCRIPTION OF EMBODIMENTS" above.

Example 1

In Example 1, aligned CNT was produced as the preparation step in which the filler assembly is prepared.

First, a thin steel plate (for example, stainless steel plate with a thickness of about 20 μm to several mm) was prepared as a growth substrate. The growth substrate was washed (for example, alkaline cleaning), and thereafter a passivated film of silica or alumina was applied to the upper face thereof, and then fine particles of a metal catalyst were applied to the upper face of the passivated film. The catalyst fine particles are metal of, for example, iron (Fe), cobalt (Co), or nickel (Ni).

Then, the growth substrate was introduced into a heating chamber, and a material gas (for example, lower hydrocarbon gas such as acetylene, methane, and butane) was supplied to the upper face of the growth substrate. In this manner, aligned CNT (vertically-aligned carbon nanotube, filler assembly) having a thickness of 50 μm was produced on the catalyst fine particles on the upper face of the growth substrate. Then, the aligned CNT was cut out from the growth substrate using a cutter. Each of the CNT fiber composing the aligned CNT at this time merely interact with CNT fiber adjacent to each other by van der Waals force, and susceptible to collapse very easily.

Then, as the first polymer, a fluorine rubber compound containing no vulcanization agent (manufactured by Chemours: trade name GLT200S) was dissolved in acetone to achieve 15 wt %. The solution was applied on a copper plate as the substrate using a doctor blade. It was allowed to stand at room temperature for several minutes, and acetone was dried naturally, and then it was heated under air atmosphere at 120° C. for 10 minutes to remove acetone. The film (first polymer layer) had a thickness of 10 to 20 μm.

Then, as the second polymer, a fluorine rubber compound containing a vulcanization agent (manufactured by Chemours: trade name GLT200S, FKM5500) was dissolved in acetone to achieve 15 wt %. It was applied on the first layer using doctor blade. It was allowed to stand at room temperature for several minutes to dry acetone naturally, and then it was heated in air at 120° C. for 10 minutes to remove acetone. The applied film (second polymer layer) had a thickness of 10 to 20 μm.

Then, the aligned CNT was placed on the second polymer layer laminated on the first polymer layer, and heat pressed at 200° C. and 0.5 MPa for 10 minutes. The aligned CNT was inserted into the two layer polymer layer, and the fluorine resin compound containing a vulcanization agent (second polymer layer) was vulcanized. The two-layer polymer layer aligned CNT (filler-two layer polymer composite) was thus produced. Thereafter, the temperature was reset to room temperature.

Then, the two-layer polymer layer aligned CNT was immersed in acetone (liquid, organic solvent). After several minutes, aligned CNT was separated from copper foil (substrate). It can be assumed that the first polymer layer containing no vulcanization agent eluted into acetone, and the aligned CNT was separated from the substrate.

Figure 4:
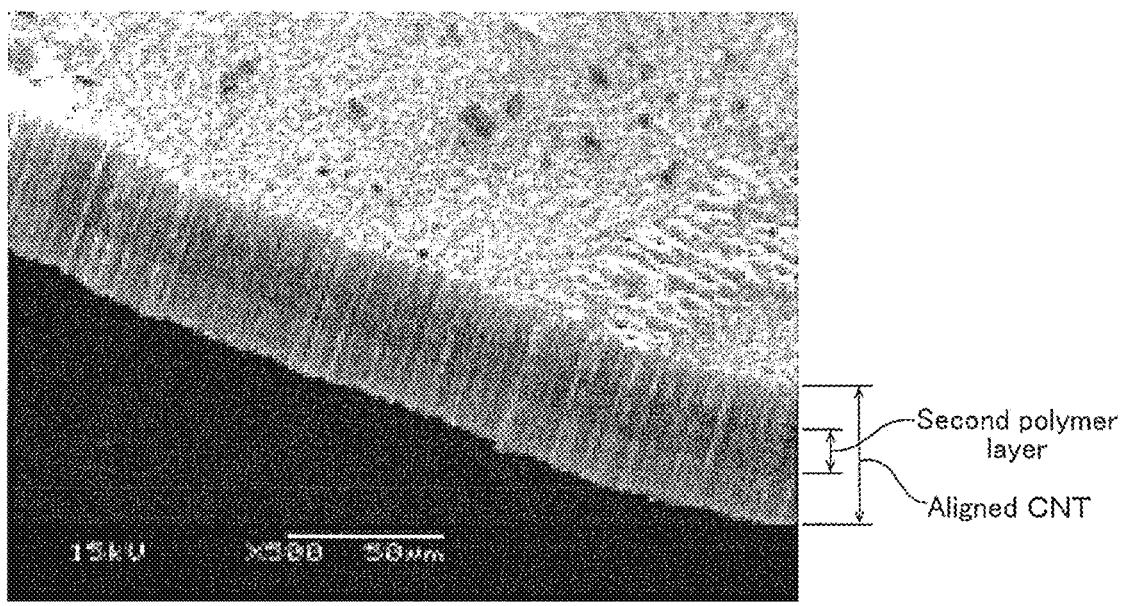
FIG. 4 is an SEM image of the filler-resin composite produced in Example 1.

Then, the aligned CNT was taken out from acetone, and dried. As a result, the aligned CNT was taken out as a sheet (filler-resin composite) fixed with the second polymer layer. The cross section of the aligned CNT was observed with scanning electron microscope (SEM). The obtained SEM image is shown in FIG. 4. A structure in which the second polymer layer is present at a center of the aligned CNT and both ends of CNT are protruded was confirmed.

As a result, the aligned CNT, which is easily collapsed and merely interact with each other by van der Waals force, is fixed by the second polymer layer, and handling properties as a sheet were excellent. Furthermore, because both ends of the aligned CNT are protruded from the second polymer layer, and therefore thermal conductivity was excellent.

Example 2

A filler-resin composite was produced in the same manner as in Example 1, except that A100 base containing no vulcanization agent (fluorine resin, manufactured by Chemours) was used as the first polymer, and A100 base containing a vulcanization agent was used as the second polymer.

Example 3

A filler-resin composite was produced in the same manner as in Example 1, except that A500 base containing no vulcanization agent (fluorine resin, manufactured by Chemours) was used as the first polymer, and A500 base containing a vulcanization agent was used as the second polymer.

Example 4

A filler-resin composite was produced in the same manner as in Example 1, except that the aligned CNT with a thickness of 100 μm was used as the aligned CNT.

Example 5

A filler-resin composite was produced in the same manner as in Example 1, except that the aligned CNT with a thickness of 200 μm was used as the aligned CNT.

Example 6

A filler-resin composite was produced in the same manner as in Example 1, except that the aligned CNT with a thickness of 300 μm was used as the aligned CNT.

Example 7

A filler-resin composite was produced in the same manner as in Example 1, except that isophorone was used as the liquid.

Example 8

A filler-resin composite was produced in the same manner as in Example 1, except that N-methylpyrrolidone was used as the liquid.

Example 9

10 wt % aqueous solution (first polymer solution) of polyvinyl alcohol (manufactured by JAPAN VAM &

POVAL CO., LTD.) was prepared as the first polymer. The first polymer solution was sprayed at one end portion of the aligned CNT, and dried naturally. Thereafter, it was heated in air atmosphere at 120° C. for 10 minutes to remove water. The first polymer solution was sprayed at the other end of the aligned CNT, and naturally dried. Thereafter, it was dried in air atmosphere at 120 C for 10 minutes to remove water.

Then, silicone rubber (manufactured by Momentive Performance Materials Inc.) as the second polymer was injected between the first polymer layers, and silicone rubber was cured (curing conditions: 100° C., 1 hour). The filler-two layer polymer composite was produced in this manner.

Next, the filler-two layer polymer composite was soaked in hot water and poly vinyl alcohol was dissolved in hot water. A filler-resin composite in which the aligned CNT was fixed with silicone rubber was produced in this manner.

Comparative Example 1

The above-described Example 1 was conducted, except that the first polymer layer was not formed, and the second polymer layer was formed directly on the substrate.

In Comparative Example 1, even if the aligned CNT and substrate were soaked in acetone, the aligned CNT was not separated from substrate, and the filler-resin composite could not be produced.

Comparative Example 2

The above-described Example 1 was conducted, except that the second polymer layer was not formed on the first polymer layer.

In Comparative Example 2, the aligned CNT was separated from the substrate by soaking in acetone, but the aligned CNT remained as the aligned CNT merely interacting with each other by van der Waals force, and was susceptible to collapse very easily.

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The method for producing a filler-resin composite of the present invention is suitably used for production of a filler-resin composite.

DESCRIPTION OF REFERENCE NUMERALS

1 filler assembly
2 first polymer layer
3 second polymer layer
S substrate

The invention claimed is:

1. A method for producing a filler-resin composite, the method including:
preparing a filler assembly in which a plurality of fillers are assembled,
applying a first polymer layer soluble in liquid on a substrate,
laminating a second polymer layer insoluble to the liquid on the first polymer layer applied on the substrate,
inserting the filler assembly to the first polymer layer penetrating through the second polymer layer, and
dissolving the first polymer layer in the liquid to remove the first polymer layer.

* * * * *